United States Patent
Bergenheim et al.

(10) Patent No.: US 6,612,606 B1
(45) Date of Patent: Sep. 2, 2003

(54) PROTECTIVE DEVICE FOR BEDS IN VEHICLES

(75) Inventors: Eddy Bergenheim, Västra Frölunda (SE); Anna Mattsdotter, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/868,723

(22) PCT Filed: Dec. 7, 1999

(86) PCT No.: PCT/SE99/02280
§ 371 (c)(1), (2), (4) Date: Sep. 25, 2001

(87) PCT Pub. No.: WO00/37285
PCT Pub. Date: Jun. 29, 2000

(30) Foreign Application Priority Data

Dec. 22, 1998 (SE) .............................................. 9804507

(51) Int. Cl.[7] .............................................. B60S 21/16
(52) U.S. Cl. .................... 280/728.1; 280/733; 280/749; 5/118; 296/190.02
(58) Field of Search .............................. 280/748, 749, 280/751, 728.1, 728.2, 733, 734; 5/118; 296/190.02, 190.03; 297/487

(56) References Cited

U.S. PATENT DOCUMENTS

| | | | | |
|---|---|---|---|---|
| 3,402,960 A | * | 9/1968 | Erke | 5/118 |
| 3,648,306 A | * | 3/1972 | Auerbach | 280/751 |
| 3,695,698 A | | 10/1972 | Trump | |
| 3,696,449 A | * | 10/1972 | Smith | 297/DIG. 3 |
| 3,836,168 A | * | 9/1974 | Nonaka et al. | 280/733 |
| 3,848,887 A | | 11/1974 | Fox | |
| 4,141,093 A | * | 2/1979 | Marsden | 5/118 |
| 4,630,324 A | * | 12/1986 | Fligsten et al. | 280/749 |
| 5,375,879 A | | 12/1994 | Williams et al. | |
| 5,474,326 A | * | 12/1995 | Cho | 280/733 |
| 5,529,341 A | * | 6/1996 | Hartigan | 280/749 |
| 5,536,042 A | | 7/1996 | Williams et al. | |
| 5,690,355 A | | 11/1997 | Kleinberg | |
| 6,367,839 B1 | * | 4/2002 | Langhoff | 280/751 |
| 6,405,391 B1 | * | 6/2002 | Hakansson | 280/749 |
| 6,428,044 B1 | * | 8/2002 | Ghantae | 280/748 |

FOREIGN PATENT DOCUMENTS

WO    WO 97/43146    11/1997

* cited by examiner

Primary Examiner—Paul N. Dickson
Assistant Examiner—Deanna Draper
(74) Attorney, Agent, or Firm—Young & Thompson

(57) ABSTRACT

A protective device (1) by a bed (5) in a vehicle (8), includes at least a catching part (3, 4) for a person (9) lying in the bed (5), which part can be arranged at least partly around the bed (5). The catching part (3, 4) can be inflated.

12 Claims, 2 Drawing Sheets

PROTECTIVE DEVICE FOR BEDS IN VEHICLES

BACKGROUND OF THE INVENTION

The present invention relates to a protective device by a bed in a vehicle, comprising at least a part for catching a person lying in the bed, which part can be arranged at least partly around the bed.

The cabins of lorries an be fitted with a sleeping area behind the driver's and passenger's seats. The sleeping area is equipped with one or more beds, so that the driver or the passenger can sleep or rest there. When a person is lying in the bed during the journey, it is desirable—and in some countries also required—to equip the bed with a protective device that can prevent injury to the person when the vehicle experiences a strong jolt, such as that sustained in a collision or if the vehicle rolls over.

It is already known to provide a protective net in front of and above a bed placed in the cabin of a vehicle. The net is connected to the bed and to the walls of the vehicle. The net is often considerably shorter than the length of the bed, where by the head end and foot end of the bed are not covered by the net. One reason why the net does not cover the head end and foot end of the bed is that cupboards or seats are placed in front of the bed at the head end and foot end of it. It is believed that, in a collision, the net together with the cupboards and seats—will catch the person who is lying in the bed. However, it has been found desirable to provide a softer means for catching the person lying in the bed.

It is also known to equip a conventional car seatbelt with an inflatable element that is inflated with the aid of a gas cartridge at the time of a collision. The seatbelt itself can be made in such a way that it is inflated in a collision The seatbelt lies in a conventional manner against the person, who is held tightly in a seat with the aid of the seatbelt. At the time of a collision, the seatbelt is inflated and restrains the person sitting in the seat.

SUMMARY OF THE INVENTION

It is an aim of the present invention to provide a protective device by a bed in a vehicle, which protective device catches the person lying in the bed when a strong jolt occurs, before the person reaches the equipment such as the cupboards and seats located in the vehicle.

This aim as achieved by a protective device of the kind in which the catching part can be inflated.

Due to the catching part, which can be arranged at least partly around the bed, being inflated when a strong jolt is experienced, the distance between the person lying in the bed and the catching part is decreased, which means that the person is only moved through a relatively short distance before reaching the catching part. At the same time, the distance to the equipment found in the vehicle is increased, which means that the person does not reach this equipment on being caught by the inflatable catching part. Since the inflatable part is inflated when the person hits it, the person is caught softly.

According to one embodiment of the invention, the catching part substantially has the same length as the bed, which means that the catching part provides direct support for the person's head and feet when the person is caught by the catching part.

BRIEF DESCRIPTION OF THE DRAWINGS

The invention is described below in more detail with the aid of the embodiment illustrated in the attached drawings, where.

DESCRIPTION OF THE PREFERRED EMBODIMENTS

Figure 1:
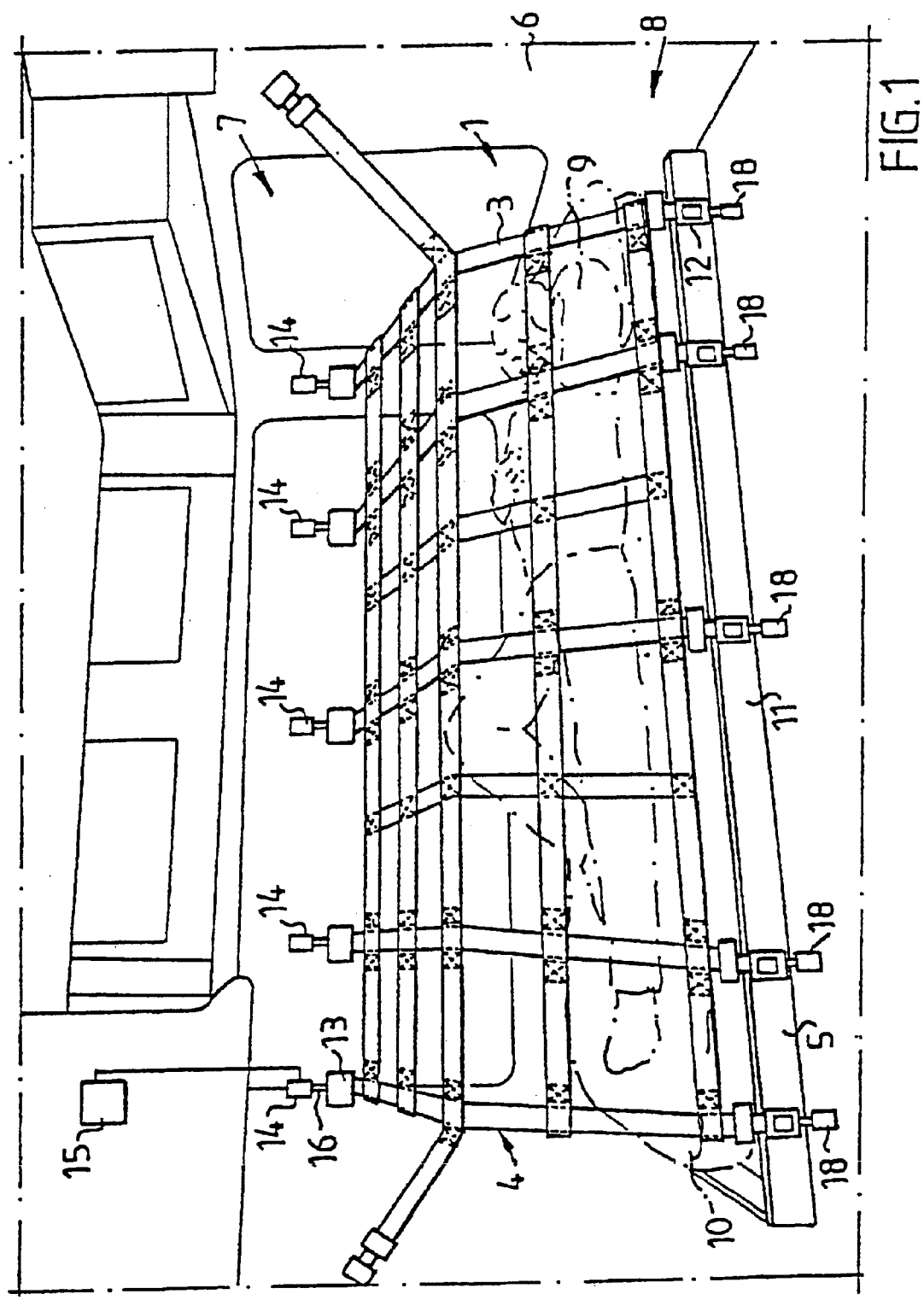
FIG. 1 shows a protective device according to the present invention before the vehicle has experienced a strong jolt.

FIG. 1 shows a protective device 1 according to the present invention. The protective device 1 comprises a catching part in the form of a net 4 made of straps 3, at least one of which is inflatable. The statement that the strap 3 is inflatable means either that the strap 3 itself can be inflatable, or that an element arranged on the strap 3 can be inflatable. A combination of these solutions is also possible.

The net 4 is connected to a bed 5 and to the walls 6 of the cabin 7 of the vehicle in which the bed 5 is arranged. According to the embodiment shown in FIG. 1, the bed 5 is so arranged in the cabin 7 that the longitudinal direction of the bed extends traverse to the travelling direction of the vehicle 8. This means that the person 9 lying in the bed 5 extends in a direction essentially transverse to the travelling direction of the vehicle 8.

The net 4 is arranged at least partly around the bed 5, so that it extends in front of and above the bed 5, and thereby in front of and above the person 9 who is lying in the bed 5. The length of the net 4 is substantially the same as that of the bed 5, so that when the vehicle 8 experiences a strong jolt as in a collision, the net 4 catches the person 9 at the foot end 10, the middle section 11 and the head end 12 of the bed 5.

The net 4 can be detachably fixed by the bed 5 and/or at the walls 6 of the cabin 7 in order to make it possible for a person 9 to get into and out of the bed 5. It is also possible to equip one of the ends of the straps 3 of the net 4 with a spring-tensioned roll-up device 13, so that the net 4 can be rolled up with the aid of this roll-up device 13 when the net 4 is not in use.

Some vehicle cabins 7 are fitted with bunk beds (not shown). In this case for example, the net for the bottom bed can connected to the bottom bed and the top bed. The net for the top bed can be connected to the top bed and to the roof of the vehicle cabin.

At least one inflating device, such as a gas cartridge 14 is coupled with one of the straps 3 forming the net 4. Preferably, a number of straps 4 should be inflatable, whereby a number of gas cartridges 14 are coupled to the straps 3 of the net 4. The gas cartridge 14 is connected to a sensor 15 that senses the jolts of the vehicle 8 and gives a signal for the inflation of one or more of the straps 3 in the net 4 when the vehicle 8 experiences a strong jolt, as in a collision. The gas cartridge 14 can be arranged by the bed 5 or at the wall 6 of the cabin, and can be connected to the strap 3 with the aid of a coupling device 16. The gas cartridge 14 can also be arranged on or in the strap 3. The location of the sensor 15 is shown schematically in FIG. 1. A gas-producing powder charge or a similar device can be used to inflate the strap 3 instead of using the gas cartridge 14 or in addition to it.

Figure 2:
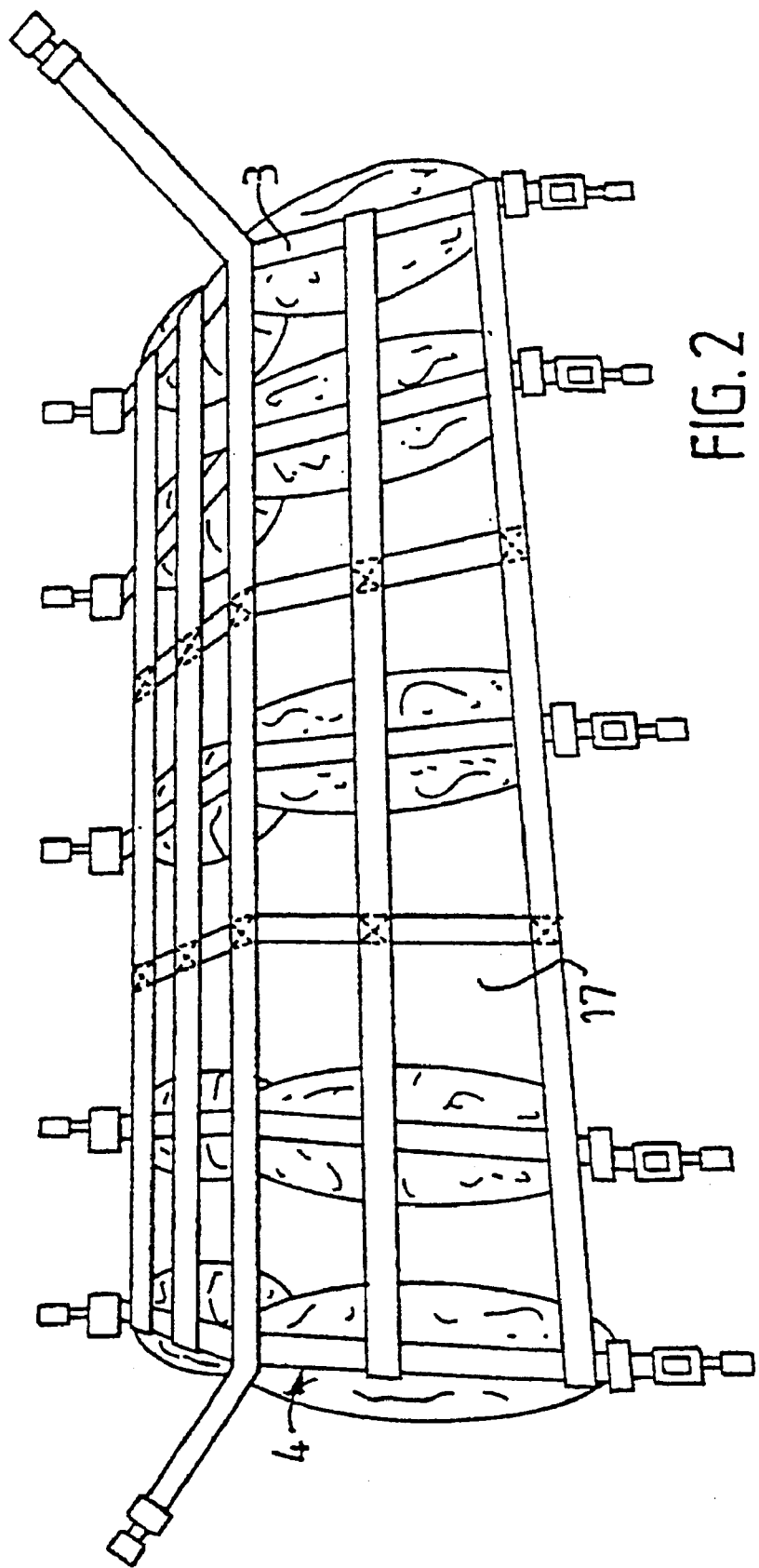
FIG. 2 shows a protective device according to the present invention when the vehicle has experienced a strong jolt

FIG. 2 shows how the straps 3 of the net 4 are inflated at the time of a strong jolt. The space 17 that is bounded by the bed 5, the net 4 and the walls 6 of the vehicle cabin 7 has been reduced, which means that the person 9 lying in the bed 5 is less likely to be thrown about in this restricted space 17. The inflated straps 3 also help to catch the person 9 softly in the net 4 at the time of a strong jolt.

It is also possible to connect a tensioning device 18 to one or more of the straps 3 of the net. This tensioning device 18 stretches and tightens the net 4 above the bed 5 and also above the person 9 lying in the bed 5 when the vehicle experiences a strong jolt. This further reduces the space 17 bounded by the bed 5, the net 4 and the walls 6 of the vehicle cabin 7 when the vehicle 8 experiences a strong jolt.

To make the arrangement comfortable for the person 9 lying in the bed 5, the net 4 should not be in contact with the person 9 when the latter is lying or sleeping in the bed 5. The net 4 should therefore be suspended and arranged at a distance from the person 9. However, it is also possible to arrange the net 4 so that it is in contact with the person 9 lying in the bed 5.

FIG. 2 shows how some of the straps 3 of the net have been inflated. It is possible to arrange the straps 3 that extend traverse to the inflated straps 3 in FIG. 2 inflatable.

Instead of a person 9 lying in the bed 5 cargo such as bags or the like (not shown) can be placed in the bed 5. When the vehicle 8 experiences a strong jolt, the net 4 will catch the cargo.

What is claimed is:

1. A protective device by a bed (5) in a vehicle (8), comprising at least a catching part (3, 4) for contacting a person (9) moving from the bed (5), said catching part being arranged at least partly around the bed (5), and can be inflated, wherein said catching part (3, 4) comprises a net (4) formed by straps (3), in which at least one of the straps (3) is inflatable inwardly toward the bed so as to reduce a space between said catching part and the bed.

2. The protective device according to claim 1, wherein the catching part (3, 4) is above the bed (5).

3. The protective device according to claim 1, wherein the catching part (3, 4) substantially has the same length as the bed (5).

4. The protective device according to claim 1, wherein the at least one strap includes an inflating device (14) that is connected to a sensor (15) that senses jolts of the vehicle (8) and gives a signal to inflate the catching part (3, 4) when the vehicle (8) experiences a strong jolt.

5. The protective device according to claim 1, wherein the catching part (3, 4) is affixable to the bed (5) and to a vehicle cabin (7) around the bed (5).

6. The protective device according to claim 1, further comprising a tensioning device (18) connected to the catching part (3,4), said tensioning device (18) stretches and tightens the catching part (3, 4) when the vehicle (8) experiences a strong jolt.

7. A protective device for a bed in a vehicle, the protective device comprising:

end straps that define longitudinal ends of the protective device when the protective device is arranged along a side of a bed in a vehicle; and a mesh supported between said end straps, said mesh having a set of longitudinal straps and a set of lateral straps transverse to said longitudinal straps, wherein plural ones of at least one of said set of lateral straps and of said set of longitudinal straps are inflatable.

8. The protective device of claim 7, wherein said plural ones are said set of lateral straps.

9. The protective device of claim 8, wherein said inflatable lateral straps extend over the bed when the protective device is arranged along the side of the bed.

10. The protective device of claim 7, wherein said end straps are inflatable.

11. The protective device of claim 7, wherein said plural ones are said set of lateral straps and wherein one of said inflatable lateral straps is halfway between said end straps.

12. The protective device of claim 11, wherein said end straps are inflatable and parallel to said lateral straps.

* * * * *